US011958269B2

(12) United States Patent
Ogawa et al.

(10) Patent No.: US 11,958,269 B2
(45) Date of Patent: *Apr. 16, 2024

(54) LAMINATED MEMBER

(71) Applicant: AGC Inc., Tokyo (JP)

(72) Inventors: Shuhei Ogawa, Tokyo (JP); Shuhei Nomura, Tokyo (JP); Norihito Nakazawa, Tokyo (JP)

(73) Assignee: AGC Inc., Tokyo (JP)

( * ) Notice: Subject to any disclaimer, the term of this patent is extended or adjusted under 35 U.S.C. 154(b) by 302 days.

This patent is subject to a terminal disclaimer.

(21) Appl. No.: 17/575,827

(22) Filed: Jan. 14, 2022

(65) Prior Publication Data

US 2022/0134713 A1    May 5, 2022

Related U.S. Application Data

(63) Continuation of application No. PCT/JP2020/027398, filed on Jul. 14, 2020.

(30) Foreign Application Priority Data

Jul. 25, 2019  (JP) .................................. 2019-137123

(51) Int. Cl.
| | |
|---|---|
| *B32B 15/04* | (2006.01) |
| *B32B 9/04* | (2006.01) |
| *B32B 17/06* | (2006.01) |
| *B32B 17/10* | (2006.01) |
| *B32B 27/28* | (2006.01) |

(52) U.S. Cl.
CPC ........ *B32B 17/10082* (2013.01); *B32B 9/045* (2013.01); *B32B 17/10* (2013.01); *B32B 17/10036* (2013.01); *B32B 27/28* (2013.01); *B32B 2250/03* (2013.01); *B32B 2307/30* (2013.01); *B32B 2307/412* (2013.01); *B32B 2307/546* (2013.01); *B32B 2307/72* (2013.01); *B32B 2307/732* (2013.01)

(58) Field of Classification Search
CPC ................................ B32B 17/10; B32B 9/045
USPC .................................. 428/426, 428, 432, 698
See application file for complete search history.

(56) References Cited

U.S. PATENT DOCUMENTS

| | | | | | |
|---|---|---|---|---|---|
| 4,554,259 | A | * | 11/1985 | Franklin | ................. C03C 3/093 |
| | | | | | 430/296 |
| 4,710,428 | A | * | 12/1987 | Tamamizu | .......... C23C 16/4581 |
| | | | | | 428/408 |
| 7,666,513 | B2 | * | 2/2010 | Boyle | ............... H01L 21/67306 |
| | | | | | 211/41.18 |
| 10,994,517 | B2 | * | 5/2021 | Sawamura | ........ B32B 17/10119 |
| 11,097,509 | B2 | * | 8/2021 | Bellman | ................. B32B 17/06 |

(Continued)

FOREIGN PATENT DOCUMENTS

| | | |
|---|---|---|
| CN | 107270755 A | 10/2017 |
| JP | 2000-130951 A | 5/2000 |

(Continued)

*Primary Examiner* — Lauren R Colgan
(74) *Attorney, Agent, or Firm* — Oblon, McClelland, Maier & Neustadt, L.L.P.

(57) ABSTRACT

A laminated member includes a glass member of which a linear transmittance at a wavelength of 850 nm is 80% or more, a bonding layer provided on or above the glass member, the bonding layer being constituted by a resin, and a Si—SiC member provided on or above the bonding layer.

11 Claims, 1 Drawing Sheet

(56) References Cited

U.S. PATENT DOCUMENTS

| | | | |
|---|---|---|---|
| 2004/0183232 A1* | 9/2004 | Kinoshita | C04B 35/64 264/332 |
| 2008/0296584 A1* | 12/2008 | Hachigo | H01L 21/76254 257/E29.089 |
| 2009/0017323 A1* | 1/2009 | Webb | B32B 37/12 428/521 |
| 2010/0041211 A1* | 2/2010 | Noda | H01L 21/6835 438/464 |
| 2010/0047588 A1* | 2/2010 | Hata | H01L 24/32 428/428 |
| 2010/0270011 A1 | 10/2010 | Takahashi et al. | |
| 2010/0327383 A1* | 12/2010 | Hayasaki | H01L 27/14618 257/E31.127 |
| 2011/0020655 A1* | 1/2011 | Tanaka | C23C 4/02 428/428 |
| 2012/0241745 A1* | 9/2012 | Ishii | H01L 27/1288 438/34 |
| 2012/0328886 A1* | 12/2012 | Schmidt | C04B 41/89 428/428 |
| 2013/0084459 A1* | 4/2013 | Larson | C09D 133/16 438/758 |
| 2013/0288876 A1 | 10/2013 | Fujisawa et al. | |
| 2014/0065763 A1* | 3/2014 | Foust | H01L 31/03925 257/E31.015 |
| 2014/0106137 A1* | 4/2014 | Kondo | H01L 21/6836 438/464 |
| 2015/0086794 A1* | 3/2015 | Akita | B32B 9/00 156/247 |
| 2015/0380292 A1 | 12/2015 | Tachioka et al. | |
| 2016/0082699 A1* | 3/2016 | Kakuta | B32B 17/1055 156/247 |
| 2017/0103945 A1* | 4/2017 | Kobayashi | H01L 21/561 |
| 2017/0154801 A1* | 6/2017 | Tagami | C09J 183/14 |
| 2018/0082914 A1* | 3/2018 | Hanawa | C03C 3/087 |
| 2018/0178245 A1* | 6/2018 | Yamada | B32B 15/08 |
| 2018/0178492 A1* | 6/2018 | Nagao | B32B 27/285 |
| 2019/0210327 A1* | 7/2019 | Sawamura | B32B 17/101 |
| 2019/0352217 A1* | 11/2019 | Lautenschläger | C03C 3/091 |
| 2019/0387322 A1* | 12/2019 | Akiyama | B32B 17/10045 |
| 2022/0003908 A1* | 1/2022 | Sahara | G02B 5/226 |
| 2022/0134713 A1* | 5/2022 | Ogawa | B32B 17/10 428/426 |
| 2023/0107722 A1* | 4/2023 | Hanawa | C04B 35/565 428/220 |

FOREIGN PATENT DOCUMENTS

| | | |
|---|---|---|
| JP | 2003-077964 A | 3/2003 |
| JP | 2004-221541 A | 8/2004 |
| JP | 2010-271031 A | 12/2010 |
| JP | 2012-056831 A | 3/2012 |
| JP | 2012-148958 A | 8/2012 |
| JP | 2013-197425 A | 9/2013 |
| JP | 2014-203980 A | 10/2014 |
| JP | 2018-202849 A | 12/2018 |
| JP | 2018-202850 A | 12/2018 |
| WO | WO 2014/163188 A1 | 10/2014 |

* cited by examiner

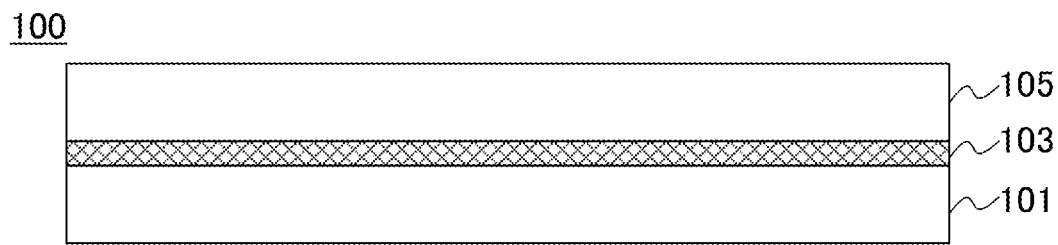

LAMINATED MEMBER

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2020/027398 filed on Jul. 14, 2020 and designating the U.S., which claims priority to Japanese Patent Application No. 2019-137123 filed on Jul. 25, 2019. The entire contents of the foregoing applications are incorporated herein by reference.

BACKGROUND OF THE INVENTION

1. Field of the Invention

The present invention relates to a laminated member obtained by laminating a glass member and a Si—SiC member.

2. Description of the Related Art

In a system kitchen, a work table, a heat cooking device, and the like are connected by a worktop. Stainless steel, artificial marble, ceramics, and the like are used as the material of the worktop.

The heat cooking device is built into the opening provided in the worktop. The heat cooking device is provided with a top plate on which an object to be heated (a pot and the like) is placed. Crystallized glass (see PTL 1), ceramics, and the like are used as the material of the top plate.

CITATION LIST

Patent Literature

PTL 1: Japanese Laid-Open Patent Publication No. 2012-148958

SUMMARY OF THE INVENTION

Technical Problem

In recent years, in terms of design, the worktop and the top plate are desired to be made of the same material. However, the existing materials have the following problems.

Stainless steel has a low scratch resistance.

Artificial marble is not suitable for the top plate material due to its low heat resistance and thermal conductivity.

In crystallized glass, it is difficult to control the precipitation of crystals, and therefore, it is difficult to manufacture a large substrate such as a substrate used for a worktop.

In addition, heating members such as a heating member used for the top plate of the heat cooking device are desired to be able to raise and lower the temperature at a high speed and to have a high impact resistance. In order to raise and lower the heating member at a high speed, the heating member is preferably thinner. Conversely, in order to improve the impact resistance of the heating member, the heating member is preferably thicker.

The present invention has been made in view of such a background, and it is an object of an aspect of the present invention to provide a laminated member suitable as a heating member.

Solution to Problem

An aspect of the present invention is a laminated member including:

a glass member of which a linear transmittance at a wavelength of 850 nm is 80% or more;

a bonding layer provided on or above the glass member, the bonding layer being constituted by a resin; and a Si—SiC member provided on or above the bonding layer.

The laminated member according to the aspect of the present invention is preferably configured such that a linear transmittance of the glass member at a wavelength of 850 nm is 90% or more.

The laminated member according to the aspect of the present invention is preferably configured such that a thermal conductivity of the Si—SiC member is 190 W/m·K to 300 W/m·K.

The laminated member according to the aspect of the present invention is preferably configured such that a thickness of the glass member is 2 mm to 40 mm, and a thickness of the Si—SiC member is 0.5 mm to 10 mm.

The laminated member according to the aspect of the present invention is preferably configured such that an absolute value $|\alpha-\beta|$ of a value obtained by subtracting a mean linear expansion coefficient $\beta$ of the glass member at 20° C. to 200° C. from a mean linear expansion coefficient $\alpha$ of the Si—SiC member at 20° C. to 200° C. is 2.0 ppm/° C. or less.

The laminated member according to the aspect of the present invention is preferably configured such that the mean linear expansion coefficient $\alpha$ of the Si—SiC member at 20° C. to 200° C. is 2.10 ppm/° C. to 4.00 ppm/° C.

The laminated member according to the aspect of the present invention is preferably configured such that a Young's modulus of the Si—SiC member is 300 GPa to 420 GPa.

The laminated member according to the aspect of the present invention is preferably configured such that the resin is a resin of which a tolerable temperature is 230° C. to 500° C.

The laminated member according to the aspect of the present invention is preferably configured such that a ratio of a content of metallic silicon in the Si—SiC member is 8 wt % to 60 wt %.

The laminated member according to the aspect of the present invention is preferably configured such that a density of the laminated member is 2.45 g/cm$^3$ to 2.65 g/cm$^3$.

The laminated member according to the aspect of the present invention is preferably configured such that an amount of bending of the laminated member is 0.25 mm or less.

The laminated member according to the aspect of the present invention preferably further includes:

a second bonding layer provided on or above the Si—SiC member; and a second Si—SiC member bonded to the Si—SiC member via the second bonding layer.

Advantageous Effects of Invention

According to an aspect of the present invention, the laminated member suitable as the heating member can be provided.

BRIEF DESCRIPTION OF THE DRAWINGS

FIG. 1 illustrates a laminated member according to an aspect of the present invention.

MODES FOR CARRYING OUT THE INVENTION

Hereinafter, a laminated member according to the aspect of the present invention is explained in detail.

In the present specification, it is to be understood that a numerical range of "X to Y" is meant to be inclusive, i.e., intended to include the lower limit value "X" and the upper limit value "Y", unless otherwise specified.

(Laminated Member)

FIG. 1 is a cross-sectional view illustrating a laminated member 100 according to an aspect of the present invention. The laminated member 100 includes a glass member 101, a bonding layer 103 provided on the glass member 101, and a Si—SiC member 105 provided on the bonding layer 103. The laminated member 100 has a laminated structure obtained by laminating, in the following order, the glass member 101, the bonding layer 103, and the Si—SiC member 105.

A production method for producing the laminated member 100 according to the aspect of the present invention may be pasting the glass member 101 and the Si—SiC member 105 together with the bonding layer 103 interposed therebetween.

The amount of bending of the laminated member 100 is preferably 0.25 mm or less. The amount of bending of the laminated member 100 is more preferably 0.20 mm or less, still more preferably 0.10 mm or less, and particularly preferably 0.05 mm or less. The amount of bending in the above-described range allows the laminated member 100 to prevent a stress from concentrating on a specific location when the stress occurs, such that the crack resistance of the laminated member 100 can be improved. Furthermore, when the laminated member 100 is made for a kitchen, the amount of bending in the above-described range allows the laminated member 100 to be less likely to reflect a distorted image of the surroundings due to the bending of the laminated member 100, so that the laminated member 100 does not detract from the design. Furthermore, when an object to be heated is placed on the laminated member 100, the amount of bending in the above-described range prevents an object to be heated from wobbling.

The amount of bending of the laminated member 100 can be measured by a non-contact 3D shape measuring instrument.

The density of the laminated member 100 is preferably 2.45 g/cm$^3$ to 2.90 g/cm$^3$. The density of the laminated member 100 is more preferably 2.50 g/cm$^3$ or more, still more preferably 2.54 g/cm$^3$ or more, and particularly preferably 2.56 g/cm$^3$ or more. The density of the laminated member 100 is more preferably 2.85 g/cm$^3$ or less, still more preferably 2.80 g/cm$^3$ or less, and particularly preferably 2.65 g/cm$^3$ or less. When the density is in the above-described range, the workability for incorporating the laminated member 100 as a heating member into the housing is improved.

The density is a value obtained by dividing the total weight of the laminated member 100 by the total volume of the laminated member 100.

The total volume of the laminated member 100 can be measured by a digital measurer.

The total volume of the laminated member 100 can be measured by a digital measure.

The size of area of the uppermost surface of the laminated member 100 on the side of the Si—SiC member 105 (the principal surface of the laminated member 100 on the side of the Si—SiC member 105 is preferably 0.01 m$^2$ to 10 m$^2$. The size of area of the uppermost surface of the laminated member 100 is more preferably 0.15 m$^2$ or more, still more preferably 0.30 m$^2$ or more, particularly preferably 0.60 m$^2$ or more, and most preferably 0.90 m$^2$ or more. The size of area of the uppermost surface of the laminated member 100 is more preferably 8 m$^2$ or less, still more preferably 6 m$^2$ or less, particularly preferably 4 m$^2$ or less, and most preferably 3 m$^2$ or less.

The size of area of the uppermost surface is calculated by measuring the dimensions of the laminated member 100 with a digital measure. When the size of area of the uppermost surface of the laminated member 100 is in the above-described range, the workability for incorporating the laminated member 100 as a heating member into the housing is improved.

The laminated member 100 can be obtained by pasting the glass member 101 and the Si—SiC member 105 with each other with the bonding layer 103 interposed therebetween at a temperature of, for example, 150° C. to 380° C.

(Si—Sic Member)

The Si—SiC member 105 is a sintered member constituted by a composite material containing silicon carbide (SiC) and silicon (Si).

The Si—SiC member 105 is a ceramic including SiC at 40 wt % to 92 wt % and Si at 8 wt % to 60 wt %.

The Si—SiC member preferably includes SiC at 50 wt % to 87 wt % and Si at 13 wt % to 50 wt %, more preferably includes SiC at 55 wt % to 82 wt % and Si at 18 wt % to 45 wt %, still more preferably includes SiC at 60 wt % to 77 wt % and Si at 23 wt % to 40 wt %, and particularly preferably includes SiC at 65 wt % to 72 wt % and Si at 28 wt % to 35 wt %. When the contents of Si and SiC of the Si—SiC member are in the above-described range, the Si—SiC member can achieve an excellent balance between a thermal property and a mechanical property of the Si—SiC member.

The composition of the Si—SiC member is not particularly limited, and may include not only SiC and Si but also a sintering aid, a tiny amount of impurities, and the like. The sintering aid is not particularly limited, and is, for example, Be, BeO, B$_4$C, BN, Al, AlN, or the like.

The thickness of the Si—SiC member 105 is preferably 0.5 mm to 10 mm. The thickness of the Si—SiC member 105 is more preferably 1.5 mm or more, still more preferably 2.0 mm or more, and particularly preferably 2.5 mm or more. The thickness of the Si—SiC member 105 is more preferably 7.0 mm or less, still more preferably 5.0 mm or less, and particularly preferably 4.0 mm or less.

Because the Si—SiC member 105 is supported by the glass member 101, the thickness of the Si—SiC member 105 can be reduced. Because the thickness of the Si—SiC member 105 can be reduced, the temperature can be raised and lowered at a high speed.

The thickness of the Si—SiC member 105 can be measured by a caliper and a digital measure.

The mean linear expansion coefficient α of the Si—SiC member 105 at 20° C. to 200° C. is preferably 2.10 ppm/° C. to 4.00 ppm/° C. Hereinafter, the mean linear expansion coefficient α of the Si—SiC member 105 at 20° C. to 200° C. is also simply referred to as a mean linear expansion coefficient α. The mean linear expansion coefficient α is more preferably 2.30 ppm/° C. or more, still more preferably 2.50 ppm/° C. or more, and particularly preferably 2.70 ppm/° C. or more. The mean linear expansion coefficient α is more preferably 3.60 ppm/° C. or less, still more preferably 3.40 ppm/° C. or less, and particularly preferably 3.20 ppm/° C. or less. When the mean linear expansion coefficient α of the Si—SiC member 105 is in the above-described range, the mean linear expansion coefficients of the Si—SiC member 105 and the glass member 101 can be readily matched with each other.

The mean linear expansion coefficient α can be measured by a thermomechanical analyzer (TMA) of which the temperature range to be measured is 20° C. to 200° C.

The thermal conductivity of the Si—SiC member 105 at 20° C. is preferably 130 W/m·K to 300 W/m·K. The thermal conductivity of the Si—SiC member 105 at 20° C. is more preferably 190 W/m·K or more, still more preferably 230 W/m·K or more, and particularly preferably 250 W/m·K or more. The thermal conductivity of the Si—SiC member 105 at 20° C. is more preferably 290 W/m·K or less, still more preferably 280 W/m·K or less, and particularly preferably 270 W/m·K or less. When the thermal conductivity of the Si—SiC member 105 is in the above-described range, the heat uniformity is improved as the heating member. Furthermore, when the thermal conductivity of the Si—SiC member 105 is in the above-described range, the reduction in the yield due to variation in the thermal conductivity during production of the Si—SiC member 105 can be prevented, and the quality of the Si—SiC member 105 can be stabilized readily.

The thermal conductivity can be measured by the laser flash method.

The specific heat of the Si—SiC member 105 at 20° C. is preferably 0.690 J/g·K to 0.745 J/g·K. The specific heat of the Si—SiC member 105 at 20° C. is more preferably 0.700 J/g-K or more, still more preferably 0.705 J/g·K or more, and particularly preferably 0.710 J/g·K or more. The specific heat of the Si—SiC member 105 at 20° C. is more preferably 0.736 J/g·K or less, still more preferably 0.727 J/g·K or less, and particularly preferably 0.718 J/g·K or less. When the specific heat of the Si—SiC member 105 satisfies the above-described range, the temperature can be raised and lowered at a high speed as the heating member.

The specific heat can be measured by the laser flash method.

The Young's modulus of the Si—SiC member 105 is preferably 300 GPa to 420 GPa. The Young's modulus of the Si—SiC member 105 is more preferably 320 GPa or more, still more preferably 330 GPa or more, and particularly preferably 340 GPa or more. The Young's modulus of the Si—SiC member 105 is more preferably 400 GPa or less, still more preferably 380 GPa or less, and particularly preferably 370 GPa or less. The thermal impact resistance increases in accordance with a decrease in the Young's modulus. The Young's modulus of the Si—SiC member 105 according to the aspect of the present invention satisfies the above-described range, and therefore, the thermal impact resistance is improved, which is preferable. Furthermore, the Young's modulus of the Si—SiC member 105 according to the aspect of the present invention is lower than the Young's moduli of other silicon carbide ceramics, and therefore, the thermal impact resistance is high, which is preferable.

The Young's modulus can be measured at 20° C. by testing methods for elastic modulus of fine ceramics defined by Japanese Industrial Standards (JIS-R1602-1995).

The flexural strength of the Si—SiC member 105 is preferably 130 MPa to 300 MPa. The flexural strength of the Si—SiC member 105 is more preferably 180 MPa or more, still more preferably 220 MPa or more, and particularly preferably 230 MPa or more. The flexural strength of the Si—SiC member 105 is more preferably 280 MPa or less, still more preferably 270 MPa or less, and particularly preferably 260 MPa or less. When the flexural strength of the Si—SiC member 105 satisfies the above-described range, breaking of the Si—SiC member 105 as well as the laminated member 100 due to a falling object can be prevented, and the impact resistance can be improved.

The flexural strength can be measured at 20° C. by a testing method for flexural strength (modulus of rupture) of fine ceramics defined by Japanese Industrial Standards (JIS-R1601-2008).

The Vickers hardness (Hv) of the Si—SiC member 105 is preferably 16 Gpa to 27 Gpa. The Vickers hardness is more preferably 19 Gpa or more, still more preferably 20 GPa or more, and particularly preferably 21 Gpa or more. The Vickers hardness is more preferably 25 Gpa or less, still more preferably 24 Gpa or less, and particularly preferably 23 Gpa or less. When the Vickers hardness of the Si—SiC member 105 satisfies the above-described range, the scratch resistances of the Si—SiC member 105 as well as the laminated member 100 are improved.

The Vickers hardness can be measured at 20° C. by a Vickers hardness testing system.

(Glass Member 101)

The glass composition of the glass member 101 is not particularly limited. For example, the glass member 101 may be soda lime glass, borosilicate glass, aluminosilicate glass, or alkali-free glass. Also, the glass member 101 may be chemically strengthened glass.

The thickness of the glass member 101 may be such a thickness that the Si—SiC member 105 can be supported. The thickness of the glass member 101 is preferably 2 mm or more, more preferably 5 mat or more, still more preferably 10 mm or more, and particularly preferably 15 mm or more. The thickness of the glass member 101 is preferably 40 mm or less, more preferably 35 mm or less, still more preferably 30 mm or less, and particularly preferably 25 mm or less. When the thickness of the glass member 101 is in the above-described range, a sufficient strength can be maintained as a support.

The thickness of the glass member 101 can be measured by a caliper and a digital measure.

A mean linear expansion coefficient β of the glass member 101 at 20° C. to 200° C. is preferably 0.01 ppm/° C. to 4.50 ppm/° C. Hereinafter, the mean linear expansion coefficient β of the glass member 101 at 20° C. to 200° C. is also simply referred to as a mean linear expansion coefficient β. The mean linear expansion coefficient β is more preferably 1.00 ppm/° C. or more, still more preferably 1.50 ppm/° C. or more, and particularly preferably 1.80 ppm/° C. or more. The mean linear expansion coefficient β is more preferably 3.50 ppm/° C. or less, still more preferably 3.10 ppm/° C. or less, and particularly preferably 2.70 ppm/° C. or less. When the mean linear expansion coefficient β of the glass member 101 is in the above-described range, the mean linear expansion coefficients of the glass member 101 and the Si—SiC member 105 can be readily matched with each other.

The absolute value |α-β| of a value obtained by subtracting the mean linear expansion coefficient β of the glass member 101 from the mean linear expansion coefficient α of the Si—SiC member 105 is preferably 2.00 ppm/° C. or less. The absolute value |α-β| is more preferably 1.00 ppm/° C. or less, still more preferably 0.50 ppm/° C. or less, and particularly preferably 0.30 ppm/° C. or less. When the difference in the mean linear expansion coefficient between them is set to the above-described values or less, the bending of the obtained laminated member 100 can be prevented.

The linear transmittance of the glass member 101 at a wavelength of 850 nm is preferably 80% or more, more preferably 85% or more, still more preferably 90% or more, and particularly preferably 92% or more. When the linear transmittance of the glass member 101 at the wavelength of 850 nm is 80% or more, a sufficient amount of infrared rays for heating use can be transmitted.

The linear transmittance is a transmittance of light straightly transmitting through the glass member 101 in a thickness direction thereof with the incidence angle of incident light being 0 degrees, and can be measured at 20° C. by a spectrophotometer.

The Young's modulus of the glass member 101 is preferably 40 GPa to 120 GPa. The Young's modulus of the glass member 101 is more preferably 45 Gpa or more, still more preferably 50 GPa or more, and particularly preferably 55 Gpa or more. The Young's modulus of the glass member 101 is more preferably 100 GPa or less, still more preferably 90 GPa or less, and particularly preferably 80 GPa or less. When the Young's modulus of the glass member 101 is in the above-described range, a sufficient strength can be maintained as a support.

The Young's modulus of the glass member 101 can be measured at 20° C. by an ultrasonic pulse method described in Japanese Industrial Standards (JIS-R1602-1995).

The flexural strength of the glass member 101 is preferably 70 MPa to 800 MPa. The flexural strength of the glass member 101 is more preferably 100 MPa or more, still more preferably 150 MPa or more, and particularly preferably 200 MPa or more. The flexural strength of the glass member 101 is more preferably 700 MPa or less, and is still more preferably 600 MPa or less. When the flexural strength of the glass member 101 is in the above-described range, breaking of the glass member 101 as well as the laminated member 100 due to a falling object can be prevented. Furthermore, when the flexural strength of the glass member 101 is in the above-described range, the reduction in the yield due to variation in the flexural strength of the glass during production of the glass can be prevented, and the quality of the glass is likely to be stabilized.

The flexural strength of the glass member 101 can be measured at 20° C. by a ring bending test of glass described in ASTM standards (ASTM C1499-01).

Next, with respect to the glass member 101 constituting an aspect of the present invention, a preferable glass composition is explained. The glass composition (content of a target component of the glass member) in the present specification is indicated by oxide-based mass percentage indication (wt %).

The glass member 101 includes $SiO_2$. $SiO_2$ is the main component of the glass. In order to improve the weather resistance of the glass, the content of $SiO_2$ is preferably 50 wt % or more, more preferably 55 wt % or more, still more preferably 58 wt % or more, and particularly preferably 61 wt % or more. In order to reduce the viscosity and enhance the productivity of the glass, the content of $Sio_2$ is preferably 81 wt % or less, more preferably 76 wt % or less, still more preferably 71 wt % or less, and particularly preferably 67 wt % or less.

The glass member 101 may include $Al_2O_3$. $Al_2O_3$ is a component that is useful for enhancing the weather resistance of the glass and reducing the linear expansion coefficient. The $Al_2O_3$ content is preferably 1.5 wt % or more, more preferably 5 wt % or more, and still more preferably 10 wt % or more. Conversely, in order to enhance the acid resistance of the glass and alleviate the devitrification of the glass, the content of $Al_2O_3$ is preferably 26 wt % or less, more preferably 23 wt % or less, and still more preferably 20 wt % or less.

The glass member 101 may include $B_2O_3$ at 5 to 23 wt %. $B_2O_3$ is a component useful for adjusting the linear expansion coefficient of the glass. In order to alleviate the linear expansion coefficient of the glass and reduce the high temperature viscosity of the glass, the content of $B_2O_3$ is 5 wt % or more preferably, more preferably 9 wt % or more, still more preferably 12 wt % or more, and particularly preferably 14.5 wt % or more. Conversely, in order to enhance the weather resistance of the glass, the content of $B_2O_3$ is preferably 22 wt % or less, more preferably 19 wt % or less, still more preferably 17.5 wt % or less, and particularly preferably 16 wt % or less.

The glass member 101 may include RO (RO is at least one of MgO, CaO, SrO, and BaO, and the content of RO indicates the total amount of MgO, CaO, SrO, and BaO). In order to reduce the viscosity of the glass and enhance the solubility and to control the expansion coefficient, the glass member 101 may include RO preferably at 0.1 wt % or more, more preferably at 1.0 wt % or more, still more preferably at 3.0 wt % or more. Conversely, in order to reduce the devitrification temperature of the glass and enhance the solubility and to control the linear expansion coefficient, the content of RO is preferably 15 wt % or less, more preferably 12 wt % or less, and still more preferably 7.5 wt % or less.

The glass member 101 may include MgO in order to reduce the viscosity of the glass and enhance the solubility and to control the linear expansion coefficient. The content of MgO is preferably 0.05 wt % or more, more preferably 0.7 wt % or more, and still more preferably 1.8 wt % or more. Conversely, in order to reduce the devitrification temperature of the glass and enhance the solubility and to control the linear expansion coefficient, the content of MgO is preferably 6 wt % or less, more preferably 4.0 wt % or less, and still more preferably 2.5 wt % or less.

The glass member 101 may include CaO in order to reduce the viscosity of the glass and enhance the solubility and to control the linear expansion coefficient. The content of CaO is preferably 10 wt % or less, more preferably 5 wt % or less, and still more preferably 3 wt % or less.

The glass member 101 may include SrO in order to reduce the devitrification temperature of the glass and enhance the solubility and to control the linear expansion coefficient. The content of SrO is preferably 15 wt % or less, more preferably 7.8 wt % or less, and still more preferably 4.5 wt % or less.

The glass member 101 may include BaO in order to reduce the devitrification temperature of the glass and enhance the productivity and to control the linear expansion coefficient. The content of BaO is preferably 20 wt % or less, more preferably 10 wt % or less, and still more preferably 6 wt % or less.

The glass member 101 preferably includes $R_2O$ at 0.01 to 5.8 wt % ($R_2O$ is at least one of $Li_2O$, $Na_2O$, and $K_2O$, and the content of $R_2O$ indicates the total amount of $Li_2O$, $Na_2O$, and $K_2O$).

$R_2O$ is a component useful for promoting melting of the glass source material and for adjusting the linear expansion coefficient, the viscosity, and the like. In order to achieve the above effects well, the content of $R_2O$ is more preferably 0.01 wt % or, more preferably 0.1 wt % or more, and still more preferably 0.5 wt % or more.

When the content of $R_2O$ is 5.8 wt % or less, the linear expansion coefficient of the glass can be reduced, and the stress that occurs during temperature change can be reduced. The content of $R_2O$ is preferably 5.0 wt % or less, more preferably 4.0 wt % or less, still more preferably 3.0 wt % or less, and particularly preferably 2.5 wt % or less.

In order to reduce the linear expansion coefficient, the total amount of $R_2O$, i.e., $Na_2O$ and $K_2O$, where $Li_2O$ is not contained, is preferably 2.9 wt % or less, more preferably 2.5 wt % or less, and still more preferably 2.0 wt % or less.

$Li_2O$ is a component useful for promoting melting of the glass source material and for adjusting the linear expansion coefficient, the viscosity, and the like. The content of $Li_2O$ may be 0 wt %. The content of $Li_2O$ is preferably 0.05 wt % or more, more preferably 0.15 wt % or more, and still more preferably 0.3 wt % or more. Conversely, in order to reduce the linear expansion coefficient of the glass and reduce the stress that occurs during temperature change, the content of $Li_2O$ is preferably 2.5 wt % or less, more preferably 2 wt % or less, and still more preferably 1.5 wt % or less.

$Na_2O$ is a component useful for promoting melting of the glass source material and for adjusting the linear expansion coefficient, the viscosity, and the like. The content of $Na_2O$ is 0 wt %. The content of $Na_2O$ is preferably 0.1 wt % or more, more preferably 0.25 wt % or more, and still more preferably 0.5 wt % or more. Conversely, in order to reduce the linear expansion coefficient of the glass and reduce the stress that occurs during temperature change, $Na_2O$ is preferably 5.6% or less, more preferably 3% or less, still more preferably 2% or less, and particularly preferably 1% or less.

$K_2O$ is a component useful for promoting melting of the glass source material and for adjusting the linear expansion coefficient, the viscosity, and the like. The content of $K_2O$ may be 0 wt %. The content of $K_2O$ is preferably 0.05 wt % or more, more preferably 0.15 wt % or more, still more preferably 0.3 wt % or more, and particularly preferably 0.55 wt % or more. Conversely, in order to reduce the linear expansion coefficient of the glass and to reduce the stress that occurs when exposed to a high temperature, $K_2O$ is preferably 3.0 wt % or less, more preferably 2.5 wt % or less, and still more preferably 1.5 wt % or less.

The glass member 101 may include $ZrO_2$ in order to improve the chemical resistance of the glass. The content of $ZrO_2$ is preferably 0.02 wt % or more, more preferably 0.2 wt % or more, and still more preferably 0.4 wt % or more. Conversely, in order to reduce the devitrification temperature of the glass and enhance the productivity, the content of $ZrO_2$ is preferably 2 wt % or less, more preferably 1.0 wt % or less, and still more preferably 0.6 wt % or less.

$P_2O_5$ is a component useful for preventing crystallization and devitrification of the glass and for stabilizing the glass, and the glass member 101 may include $P_2O_5$. In order to achieve the above effects well, the content of $P_2O_5$ is preferably 0.8 wt % or more, more preferably 4.5 wt % or more, and still more preferably 7.7 wt % or more. Conversely, when the content of $P_2O_5$ is 22 wt % or less, the glass can be stabilized without excessively increasing the high temperature viscosity of the glass. The content of $P_2O_5$ is preferably 18 wt % or less, and more preferably 13.5 wt % or less.

The glass member 101 may include $Fe_2O_3$ in order to improve the fining of the glass and control the temperature of the bottom substrate in the melting furnace without impairing the color of the glass. The glass member 101 includes $Fe_2O_3$ preferably at 0.00001 to 0.2 wt %, more preferably at 0.0001 to 0.05 wt %, and particularly preferably at 0.001 to 0.005 wt %. The content of $Fe_2O_3$ is preferably 0.00001 wt % or more, more preferably 0.0001 wt % or more, and still more preferably 0.001% or more. Conversely, in order to maintain the color of the glass, the content of $Fe_2O_3$ is preferably 0.2 wt % or less, more preferably 0.15 wt % or less, still more preferably 0.1 wt % or less, and particularly preferably 0.01 wt % or less.

In a typical case, the glass member 101 constituting an aspect of the present invention is preferably substantially composed of the above-described components, but furthermore, the glass member 101 may include ZnO at up to 13 wt % to such an extent that the object according to an aspect of the present invention is not impaired.

Furthermore, in a typical case, the glass member 101 constituting an aspect of the present invention is preferably substantially composed of the above-described components, but furthermore, the glass member 101 may include other components ($TiO_2$ and the like) at a total of up to 8 wt % to such an extent that the object according to an aspect of the present invention is not impaired.

Furthermore, the glass member 101 constituting an aspect of the present invention may include, as necessary, $SO_3$, chloride, fluoride, halogen, $SnO_2$, $Sb_2O_3$, $As_2O_3$, and the like, as a fining agent used in the melting process of glass. Furthermore, the glass member 101 may include coloring components such as Ni, Co, Cr, Mn, V, Se, Au, Ag, Cd, and the like for color adjustment. In a case where the glass member 101 is to be actively colored, the glass member 101 may include coloring components such as Fe, Ni, Co, Cr, Mn, V, Se, Au, Ag, Cd, and the like in a range of 0.1 wt % or more.

In a case where the glass member 101 includes, from among the above components, at least one selected from the group consisting of $SO_3$, chloride, fluoride, halogen, $SnO_2$, $Sb_2O_3$, and $As_2O_3$, the total content of the at least one selected from the above group is preferably 0.0001 wt % or more, more preferably 0.0005 wt % or more, still more preferably 0.001 wt % or more, for the fining of the glass. Conversely, in order not to adversely affect the glass property, the total content of the at least one selected from the above group is preferably 2.0 wt % or less, more preferably 1.5 wt % or less, and still more preferably 1.0 wt % or less.

(Bonding Layer 103)

The bonding layer 103 is a resin for bonding the glass member 101 and the Si—SiC member 105. Examples of resins constituting the bonding layer 103 include epoxy resin, silicone resin, and fluorine resin.

The bonding layer 103 can be made by, for example, a heat press device. A resin film constituting the bonding layer 103 is sandwiched between the glass member 101 and the Si—SiC member 105 (this configuration is adopted as a temporary laminate). The temporary laminate is heated to a temperature above the softening point of the resin film, and the temporary laminate is pressurized to bond the glass member 101 and the Si—SiC member 105. In order to prevent bubbles from getting caught during bonding, it is preferable to pressurize the temporary laminate under vacuum atmosphere.

In order to enhance the anchor effect, a contact surface of the glass member 101 facing the resin film (the bonding layer 103) and a contact surface of the Si—SiC member 105 facing the resin film (the bonding layer 103) may be roughened moderately through blasting.

The thickness of the bonding layer 103 is preferably 0.001 mm to 0.300 mm. The thickness of the bonding layer 103 may be 0.005 mm or more, may be 0.008 mm or more, or may be 0.010 mm or more. The thickness of the bonding layer 103 may be 0.150 mm or less, may be 0.050 mm or less, or may be 0.030 mm or less.

The thickness of the bonding layer 103 can be calculated by processing digital data of cross-sectional SEM images with image processing software.

The linear transmittance of the bonding layer 103 at a wavelength of 850 nm is preferably 88% or more, more preferably 91% or more, still more preferably 93% or more, and particularly preferably 95% or more. When the linear transmittance of the bonding layer 103 is 88% or more, a sufficient amount of infrared rays for heating use can be transmitted.

The linear transmittance is a transmittance of light straightly transmitting through the bonding layer 103 in a thickness direction thereof where the incidence angle of incident light is defined as 0 degrees, and can be measured at 20° C. with a spectrophotometer.

The tolerable temperature of the bonding layer 103 is preferably 200° C. to 500° C. The tolerable temperature of the bonding layer 103 is more preferably 230° C. or more, still more preferably 260° C. or more, particularly preferably 310° C. or more, and more particularly preferably 360° C. or more. The tolerable temperature of the bonding layer 103 may be 470° C. or less, may be 450° C. or less, or may be 430° C. or less.

The tolerable temperature of the bonding layer 103 is set to a temperature at which the weight of the measurement target object decreases 1 wt % that is obtained by conducting thermogravimetric analysis (TGA) under air atmosphere.

(Another example of the aspect of the present invention) Another example of the aspect according to the present invention that is different from the above is explained. The laminated member according to this aspect further includes a second bonding layer provided on the Si—SiC member 105 and a second Si—SiC member that is bonded with the Si—SiC member 105 via the second bonding layer. The second Si—SiC member is configured in substantially the same manner as the Si—SiC member 105 above, and accordingly explanation thereabout is omitted.

With the structure in which the Si—SiC member 105 and the second Si—SiC member are laminated, a laminated member in a more complicated shape can be readily produced. For example, when a space for inserting a sensor for temperature measurement is provided in the laminated member, one of the Si—SiC member 105 and the second Si—SiC member is grooved in advance, and is pasted to the other of the Si—SiC member 105 and the second Si—SiC member, so that the space can be readily provided in the laminated member.

The method for bonding the Si—SiC member 105 and the second Si—SiC member with each other via the second bonding layer is not particularly limited, and may be: for example, a bonding using a resin such as an epoxy resin, a fluorine resin, and the like; a bonding using a molten metal such as tin, indium, and the like; and a bonding using glass frit. When the laminated member is assumed to be used as a heating member, a bonding using metal is preferable in terms of heat resistance and thermal conductivity.

In terms of heat resistance and thermal conductivity, glass frit has a high heat resistance but has a low thermal conductivity, and resin has a low heat resistance and a low thermal conductivity, and therefore, the bonding using metal is preferable. Examples of metals include indium, tin, tin-based alloys, lead-based alloys, and the like. In terms of thermal conductivity, heat resistance and environmental load, metallic tin and tin-based alloys are preferable in particular.

An example for bonding the Si—SiC member 105 and the second Si—SiC member with each other by using molten metal is explained. The Si—SiC member 105 and the second Si—SiC member are heated to a desired temperature, for example, 250° C. to 270° C. While ultrasonic waves are applied to the bonding surfaces of the Si—SiC member 105 and the second Si—SiC member that have been heated, molten metal at a desired temperature (for example, 250° C. to 270° C.) is applied to the bonding surfaces, and thereafter, the bonding surfaces are overlaid on each other.

The laminated member further includes a third bonding layer provided on the second Si—SiC member and a third Si—SiC member bonded to the second Si—SiC member via the third bonding layer. The third bonding layer is configured in a similar manner to the second bonding layer. Further, the third Si—SiC member is configured in a similar manner to the Si—SiC member 105. However, in terms of thickness, the laminated member preferably does not additionally include the third bonding layer and the third Si—SiC member.

The laminated member according to the aspect of the present invention may include a configuration capable of rapidly cooling the laminated member. For example, the laminated member according to the aspect of the present invention may include a conduit that is disposed between the Si—SiC member 105 and the bonding layer 103, between the Si—SiC member 105 and the second bonding layer, or between the second Si—SiC member and the second bonding layer. Alternatively, in the laminated member according to the aspect of the present invention, the Si—SiC member 105 or the second Si—SiC member may be processed to serve as a conduit. Alternatively, in the laminated member according to the aspect of the present invention, a conduit may be provided between the glass member 101 and the bonding layer 103. Alternatively, in the laminated member according to the aspect of the present invention, the glass member 101 may be processed to serve as a conduit. The laminated member can be cooled by flowing water through the conduit.

The laminated member according to the aspect of the present invention may include an anti-reflective film for enhancing the transmittance and the emission efficiency. For example, the laminated member according to the aspect of the present invention may include an anti-reflective film provided on a principal surface of the glass member 101 on an opposite side from the bonding layer 103 and/or a principal surface of the glass member 101 on the side of the bonding layer 103. Also, the laminated member according to the aspect of the present invention may include an anti-reflective film provided on a principal surface of the Si—SiC member 105 on the side of the bonding layer 103 or a principal surface of the second Si—SiC member on the side of the second bonding layer. When the anti-reflective film is provided on the surface for transmitting infrared rays, the emission efficiency (the heating efficiency) can be enhanced.

The laminated member according to the aspect of the present invention may include a temperature sensor. For example, the laminated member according to the aspect of the present invention may include a temperature sensor inside of the Si—SiC member 105 or the second Si—SiC member. For example, a hole is made in the side surface of the Si—SiC member 105 or the second Si—SiC member, and the temperature sensor is inserted into the hole. In this case, the temperature sensor is provided immediately under a principal surface of the Si—SiC member 105 on an opposite side from the bonding layer 103 or immediately under a principal surface of the second Si—SiC member on an opposite side from the second bonding layer. The temperature sensor is provided so that the temperature sensor does not come into contact with the bonding layer 103 or the second bonding layer and so that the temperature sensor is not exposed. The temperature sensor can measure the temperature of the principal surface of the Si—SiC member 105 on an opposite side from the bonding layer 103 or the temperature of the principal surface of the second Si—SiC member on an opposite side from the second bonding layer.

The laminated member according to the aspect of the present invention can be suitably used as a heating member. The laminated member according to the aspect of the present invention can be suitably used as, for example, a heating member of a heat cooking device.

Also, the laminated member according to the aspect of the present invention may be used as a worktop (a countertop) of a kitchen.

Also, the laminated member according to the aspect of the present invention may have the functions of both of a top plate of a heat cooking device and a worktop of a kitchen.

EXAMPLE

Hereinafter, an aspect of the present invention is explained with reference to Examples, but the aspect of the present invention is not limited by these Examples. In each of the measurement result in the tables, a blank field indicates that the value in that field was not measured.
(Production of Glass Member Sample)
Produced glass is shown in Table 1.

temperature higher than the glass transition point by 50° C. for 1 hour, and then cooled to room temperature at a rate of 0.5° C./min to obtain a glass block.

As the glass member sample (Vii) in the Table 1, synthetic quartz glass (product name: AQ) made by AGC Inc. was used.

The glass member sample (Viii) in the Table 1 was prepared as follows so as to achieve the glass compositions shown in Table 1 in oxide-based mass percentage indication. Commonly used glass source materials such as oxides, hydroxides, carbonates, or nitrates were selected as necessary and weighed to be 10000 g as glass. Next, the mixed raw materials were placed in a platinum crucible, placed in an electrical resistance furnace at 1600° C., melted for about 5 hours, defoamed, and homogenized. The obtained molten glass was poured into a mold, molded with a stainless roller, and then cooled to room temperature using an annealing furnace. The glass molded body was placed in an electric furnace and heated at 780° C. for 2 hours, then heated to 850° C. at a rate of 1.5° C./min, heated at 850° C. for 3 hours, and then cooled to room temperature at a rate of 5.0° C./min. As a result, a glass block was obtained.

The obtained glass block was cut, ground, and polished to obtain a glass member sample (with a length of 300 mm and a width of 300 mm). The following measurements were conducted on the obtained glass member sample. The measurement results are shown in Table 1.

TABLE 1

| | | Glass member sample | | | | | | | | | | |
|---|---|---|---|---|---|---|---|---|---|---|---|---|
| | | i-A | i-B | i-C | i-D | ii | iii | iV | V | Vi | Vii | Viii |
| Composition (wt %) | $SiO_2$ | 78.13 | 78.13 | 78.13 | 78.13 | 80.84 | 78.13 | 78.13 | 58.57 | 72.45 | 100 | 62.91 |
| | $Al_2O_3$ | 1.98 | 1.98 | 1.98 | 1.98 | 2.16 | 1.98 | 1.98 | 15.71 | 1.36 | | 23.04 |
| | $B_2O_3$ | 14.19 | 14.19 | 14.19 | 14.19 | 13.16 | 14.19 | 14.19 | 9.05 | | | |
| | MgO | | | | | | | | 3.23 | 2.84 | | 0.78 |
| | CaO | | | | | | | | 3.98 | 9.55 | | |
| | SrO | | | | | | | | 7.67 | | | |
| | BaO | | | | | | | | | | | 2.89 |
| | Total RO | | | | | | | | 14.88 | 12.39 | | 3.67 |
| | $Li_2O$ | | | | | | | | | | | 4.47 |
| | $Na_2O$ | 5.57 | 5.57 | 5.57 | 5.57 | 3.68 | 5.57 | 5.57 | 1.50 | 13.67 | | 0.52 |
| | $K_2O$ | 0.07 | 0.07 | 0.07 | 0.07 | 0.16 | 0.07 | 0.07 | 0.28 | | | 0.57 |
| | Total $R_2O$ | 5.64 | 5.64 | 5.64 | 5.64 | 3.84 | 5.64 | 5.64 | 1.78 | 13.67 | | 5.56 |
| | $ZrO_2$ | 0.03 | 0.03 | 0.03 | 0.03 | | 0.03 | 0.03 | | | | 2.12 |
| | $TiO_2$ | | | | | | | | | | | 0.71 |
| | $Fe_2O_3$ | 0.03 | 0.03 | 0.03 | 0.03 | | 0.03 | 0.03 | | 0.13 | | |
| | $P_2O_5$ | | | | | | | | | | | 0.86 |
| | ZnO | | | | | | | | | | | 0.39 |
| | $SnO_2$ | | | | | | | | | | | 0.74 |
| | SUM | 100 | 100 | 100 | 100 | 100 | 100 | 100 | 100 | 100 | 100 | 100 |
| Thickness (mm) | | 10 | 2 | 1.5 | 20 | 10 | 10 | 10 | 10 | 10 | 10 | 10 |
| Mean linear expansion coefficient β (ppm/° C.) | | 2.9 | 2.9 | 2.9 | 2.9 | 3.3 | 2.9 | 2.9 | 4.2 | 8.1 | 0.05 | 0.04 |
| Linear transmittance (%) | | 90.9 | 91.4 | 91.5 | 90.1 | 91.7 | 90.4 | 90.4 | 90.6 | 92.7 | 92.8 | 89.0 |
| Young's modulus (GPa) | | 57 | 57 | 57 | 57 | 68 | 57 | 59 | 77 | 74 | 74 | 91 |
| Flexural strength (MPa) | | 89 | 89 | 89 | 89 | 108 | 89 | 211 | 112 | 94 | 94 | 156 |

The glass member samples (i-A) to (Vi) in the Table 1 were prepared as follows so as to achieve the glass compositions shown in Table 1 in oxide-based mass percentage indication. Commonly used glass source materials such as oxides, hydroxides, carbonates, or nitrates were selected as necessary and weighed to be 10000 g as glass. Next, the mixed raw materials were placed in a platinum crucible, placed in an electrical resistance furnace at 1500 to 1700° C., melted for about 12 hours, defoamed, and homogenized. The obtained molten glass was poured into a mold, held at a The thickness was measured at 20° C. with a digital measure.

The mean linear expansion coefficient was measured by a thermomechanical analyzer (TMA) "TMA4000SA" made by Bruker AXS in a temperature range of 20° C. to 200° C.

The linear transmittance was measured at 20° C. with a wavelength of 850 nm with a spectrophotometer.

The Young's modulus was measured at 20° C. by an ultrasonic pulse method described in Japanese Industrial Standards (JIS-R1602-1995).

The flexural strength was measured at 20° C. by a ring bending test of glass described in ASTM standards (ASTM C1499-01).

(Production of Si—SiC Member Sample)

Table 2 shows produced Si—SiC.

TABLE 2

| | | Si—SiC member sample | | | | | | | | | |
|---|---|---|---|---|---|---|---|---|---|---|---|
| | | a-1 | a-2 | a-3 | a-4 | b | c | d | e | f | g |
| Composition | Si | 33 | 33 | 33 | 33 | 29 | 37 | 41 | 28 | 57 | 11 |
| (wt %) | SiC | 67 | 67 | 67 | 67 | 71 | 63 | 59 | 72 | 43 | 89 |
| | SUM | 100 | 100 | 100 | 100 | 100 | 100 | 100 | 100 | 100 | 100 |
| Thickness (mm) | | 5 | 10 | 15 | 8 | 5 | 5 | 5 | 5 | 5 | 5 |
| Second bonding layer (Tin metal) (mm) | | — | — | — | 0.4 | — | — | — | — | — | — |
| Mean linear expansion coefficient α (ppm/° C.) | | 2.6 | 26 | 2.6 | 2.6 | 2.3 | 2.7 | 2.7 | 2.2 | 2.8 | 2.7 |
| Thermal conductivity (W/m · K) | | 225 | 225 | 225 | 225 | 242 | 231 | 235 | 220 | 256 | 169 |
| Specific heat (J/g*K) | | 0.716 | 0.716 | 0.716 | 0.716 | 0.738 | 0.732 | 0.744 | 0.719 | 0.720 | 0.749 |
| Young's modulus (GPa) | | 365 | 365 | 365 | 365 | 383 | 348 | 321 | 391 | 221 | 404 |
| Flexural strength (MPa) | | 207 | 207 | 207 | 207 | 256 | 165 | 131 | 253 | 82 | 231 |
| Vickers hardness (HV) (GPa) | | 20 5 | 20.5 | 20.5 | 20.5 | 22.5 | 19.4 | 16.7 | 23.5 | 9.1 | 23.9 |

Si—SiC member samples (a-1) to (a-3) were prepared as follows. SiC powder (made by Pacific Rundum Co., Ltd., Model number: GMF-12S (average particle diameter 0.7 μm)) at 71.0 wt %, carbon black (average particle diameter 0.03 μm) at 2.0 wt %, METOLOSE (made by Shin-Etsu Chemical Co., Ltd., model number: SM8000) as a binder at 5.5 wt %, and purified water at 21.5 wt % were added to a mixer (made by Miyazaki Iron Works Co., Ltd., Model number: MP100) and kneaded for six hours to obtain a kneaded matter. The obtained kneaded matter was introduced into an extrusion molding machine (made by Miyazaki Iron Works Co., Ltd., Model number: FM100), and the kneaded matter was extruded and molded under a condition of a head pressure of 1.0 MPa and a discharge speed of 1200 g/min to obtain a green body. The obtained green body was dried at 50° C. for 4 days and then heated under air atmosphere at 450° C. for 3 hours, s that the obtained green body is degreased to obtain a degreased body. The obtained degreased body was baked in a baking furnace under a condition of 1700° C. with vacuum atmosphere of $10^{-3}$ P for two hours to obtain a sintered body. After the baking, the sintered body was impregnated with Si under a condition of 1670° C. with an argon atmosphere to obtain a Si—SiC member. The obtained Si—SiC member was processed to have a length of 30 cm, a width of 30 cm, and thicknesses as shown in Table 2.

A Si—SiC member sample (a-4) was prepared by bonding a Si—SiC member and a second Si—SiC member by using metallic tin. The Si—SiC member and the second Si—SiC member were prepared in the substantially the same manner as the sample (a-1) and processed to have a thickness of thickness 3.8 mm. The Si—SiC member and the second Si—SiC member were bonded as follows. The Si—SiC member and the second Si—SiC member were heated to 250° C., and metallic tin previously melted at 250° C. was applied to the bonding surfaces of the Si—SiC member and the second Si—SiC member while applying ultrasonic waves, and after the metallic tin was applied, the bonding surfaces were overlaid on each other.

A Si—SiC member sample (b) was prepared in substantially the same manner as the sample (a-1) except that the amount of source powder was changed. The sample (b) included SiC powder at 69.0 wt %, carbon black at 6.0 wt %, METOLOSE at 5.1 wt %, and pure water at 19.9 wt %.

A Si—SiC member sample (c) was prepared in substantially the same manner as the sample (a-1) except that the amount of source powder was changed. The amount of source powder of the sample (c) included SiC powder at 69.0 wt %, carbon black at 1.0 wt %, METOLOSE at 6.1 wt %, and pure water at 23.9 wt %.

A Si—SiC member sample (d) was prepared in substantially the same manner as the sample (a-1) except that the amount of source powder was changed. The amount of source powder of the sample (d) included SiC powder at 64.0 wt %, carbon black at 0.5 wt %, METOLOSE at 7.2 wt %, and pure water at 28.3 wt %.

A Si—SiC member sample (e) was prepared in substantially the same manner as the sample (a-1) except that the amount of source powder was changed. The amount of source powder of the sample (e) included SiC powder at 70.0 wt %, carbon black at 6.0 wt %, METOLOSE at 4.9 wt %, and pure water at 19.1 wt %.

A Si—SiC member sample (f) was prepared in substantially the same manner as the sample (a-1) except that the amount of source powder and the type of the silicon powder of the source were changed. The amount of source powder of the sample (f) included SiC powder at 48.0 wt %, silicon powder (made by Yamaishi Kinzoku Kabushiki Kaisya, Model number: No. 700 (average particle diameter 2.5 μm)) at 25.0 wt %, METOLOSE at 5.5 wt %, and pure water at 21.5 wt %.

A Si—SiC member sample (g) was prepared in substantially the same manner as the sample (a-1) except that the type and the amount of the source powder were changed. The amount of source powder of the sample (g) included SiC powder (made by Pacific Rundum Co., Ltd., Model number: GMF-12S (average particle diameter 0.7 μm)) at 63.0 wt %, SiC powder (made by Pacific Rundum Co., Ltd., Model number: GMF-5C (average particle diameter 2.4 μm)) at 21.0 wt %, METOLOSE at 3.3 wt %, and pure water at 12.7 wt %.

The following measurements were conducted with respect to the obtained Si—SiC member samples (a-1) to (g). Table 2 shows measurement results.

The amounts of components (compositions) in the Si—SiC member samples were measured by an inductively coupled plasma mass spectrometer ICP-MS (made by Shimadzu Corporation).

The thicknesses were measured at 20° C. using a caliper (AD-5764A) made by A&D Company, Limited.

The thickness of the second bonding layer (metallic tin) for bonding the Si—SiC member and the second Si—SiC member is a difference between: the thickness of the entire Si—SiC member sample (a-4); and a summation of the thickness of the Si—SiC member and the thickness of the second Si—SiC member that have been prepared.

The mean linear expansion coefficient α was measured by a thermomechanical analyzer (TMA) "TMA4000SA" made by Bruker AXS in a temperature range of 20° C. to 200° C.

The thermal conductivity was measured under a temperature of 20° C. by a laser flash thermal measurement device "MODEL LFA-502" made by KYOTO ELECTRONICS MANUFACTURING CO., LTD.

The specific heat was measured under a temperature of 20° C. by the laser flash thermal measurement device "MODEL LFA-502" made by KYOTO ELECTRONICS MANUFACTURING CO., LTD.

The Young's modulus was measured at 20° C. by testing methods for elastic modulus of fine ceramics defined by Japanese Industrial Standards (JIS-R1602-1995) using Auto Com universal material testing instrument "AC-300KN" made by T.S.E Co., Ltd.

The flexural strength was measured at 20° C. by a testing method for flexural strength (modulus of rupture) of fine ceramics defined by Japanese Industrial Standards (JIS-R1601-2008) using Auto Com universal material testing instrument "AC-300KN" made by T.S.E Co., Ltd.

The Vickers hardness was measured at 20° C. by pushing in for 15 seconds with a pushing load of 10 kgf using a Vickers hardness testing system (made by NIPPON STEEL & SUMIKIN TECHNOLOGY Co., Ltd.).

(Bonding Layer)

With respect to resin films of resins shown in Table 3, the following measurements were conducted. Table 3 shows measurement results.

TABLE 3

| Bonding layer (resin) | Fluorine (F) | Epoxy (EP) | Polyimide (PI) |
|---|---|---|---|
| Thickness (mm) | 0.03 | 0.03 | 0.03 |
| Linear transmittance (%) | 95.4 | 90.4 | 87.8 |
| Tolerable temperature (° C.) | 411 | 246 | 215 |

The thickness was measured with a digital measure.

The linear transmittance was measured by a spectrophotometer at 20° C. with 850 nm.

The tolerable temperature was set to a temperature at which the weight of the resin film decreased 1 wt % that was obtained by conducting thermogravimetric analysis (TGA) under air atmosphere.

The resin films shown in Table 3 are to be bonding layers of laminated members.

(Production of Laminated Member)

Table 4 and Table 5 show prepared laminated members.

TABLE 4

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Glass member sample | i-A | i-A | i-A | i-A | i-A | i-A | i-A | i-A | i-A | i-B | ii | iii |
| Bonding layer | F | EP | PI | F | F | F | F | F | F | F | F | F |
| Si—SiC member sample | a-1 | a-1 | a-1 | b | c | d | e | f | g | a-2 | a-1 | a-1 |
| Temperature increase evaluation | ○ | ○ | ○ | ○ | ○ | ○ | ○ | ○ | ○ | ○ | ○ | ○ |
| Impact resistance evaluation | ○ | ○ | ○ | ○ | ○ | ○ | ○ | Δ | ○ | ○ | ○ | ○ |
| Heat-resistance evaluation | ○ | ○ | x | ○ | ○ | ○ | ○ | ○ | ○ | ○ | ○ | ○ |
| The amount of bending (mm) | 0.055 | 0.064 | 0.051 | 0.076 | 0.048 | 0.044 | 0.092 | 0.019 | 0.035 | 0.058 | 0.077 | 0.053 |
| Density (g/cm$^3$) | 2.62 | 2.61 | 2.61 | 2.63 | 2.61 | 2.59 | 2.63 | 2.55 | 2.70 | 2.79 | 2.62 | 2.62 |
| The size of area (m$^2$) | 0.09 | 0.09 | 0.09 | 0.09 | 0.09 | 0.09 | 0.09 | 0.09 | 0.09 | 0.09 | 0.09 | 0.09 |
| Thickness of bonding layer (mm) | 0.02 | 0.04 | 0.04 | 0.02 | 0.02 | 0.02 | 0.02 | 0.02 | 0.02 | 0.03 | 0.02 | 0.02 |
| Mean linear expansion coefficient α (ppm/° C.) | 2.6 | 2.6 | 2.6 | 2.3 | 2.7 | 2.7 | 2.2 | 2.8 | 2.7 | 2.6 | 2.6 | 2.6 |
| Mean linear expansion coefficient β (ppm/° C.) | 2.9 | 2.9 | 2.9 | 2.9 | 2.9 | 2.9 | 2.9 | 2.9 | 2.9 | 2.9 | 3.3 | 2.9 |
| \|α − β\| (ppm/° C.) | 0.33 | 0.33 | 0.33 | 0.56 | 0.24 | 0.16 | 0.72 | 0.12 | 0.23 | 0.33 | 0.73 | 0.33 |

TABLE 5

| | Examples | | | | | | | | | | |
|---|---|---|---|---|---|---|---|---|---|---|---|
| | 13 | 14 | 15 | 16 | 17 | 18 | 19 | 20 | 21 | 22 | 23 |
| Glass member sample | iV | V | Vi | Vii | — | — | i-A | Viii | i-C | i-D | i-A |
| Bonding layer | F | F | F | F | — | — | — | — | F | F | F |
| Si—SiC member sample | a-1 | a-1 | a-1 | a-1 | a-3 | a-1 | — | — | a-1 | a-1 | a-4 |
| Temperature increase evaluation | ○ | ○ | ○ | ○ | x | ○ | x | x | ○ | ○ | ○ |
| Impact resistance evaluation | ○ | ○ | ○ | ○ | — | x | — | — | Δ | ○ | ○ |
| Heat-resistance evaluation | ○ | ○ | ○ | ○ | ○ | ○ | ○ | ○ | ○ | ○ | ○ |
| The amount of bending (mm) | 0.052 | 0.192 | 0.542 | 0.235 | 0.010 | 0.011 | 0.008 | 0.013 | 0.045 | 0.044 | 0.121 |
| Density (g/cm$^3$) | 2.62 | 2.62 | 2.62 | 2.72 | 2.85 | 2.85 | 2.48 | 2.51 | 2.77 | 2.78 | 2.75 |

TABLE 5-continued

|  | Examples | | | | | | | | | | |
| --- | --- | --- | --- | --- | --- | --- | --- | --- | --- | --- | --- |
|  | 13 | 14 | 15 | 16 | 17 | 18 | 19 | 20 | 21 | 22 | 23 |
| The size of area (m$^2$) | 0.09 | 0.09 | 0.09 | 0.09 | 0.09 | 0.09 | 0.09 | 0.09 | 0.09 | 0.09 | 0.09 |
| Thickness of bonding layer (mm) | 0.02 | 0.04 | 0.04 | 0.01 | — | — | — | — | 0.02 | 0.02 | 0.02 |
| Mean linear expansion efficient α (ppm/° C.) | 2.6 | 2.6 | 2.6 | 2.6 | 2.6 | 2.6 | — | — | 2.6 | 2.6 | 2.6 |
| Mean linear expansion coefficient β (ppm/° C.) | 2.9 | 4.2 | 8.1 | 0.05 | — | — | 2.9 | 0.04 | 2.9 | 2.9 | 2.9 |
| |α − β| (ppm/° C.) | 0.33 | 1.63 | 5.53 | 2.52 | — | — | — | — | 0.33 | 0.33 | 0.33 |

According to the combination shown in Table 4 and Table 5, samples (laminated members) of Examples 1 to 16 and 21 to 23 have been prepared. In addition, samples of Examples 17 to 20 were prepared. Example 1 to 16 and 21 to 23 are examples. Examples 17 to 20 are comparative examples.

First, using SiC abrasive paper, a surface of the glass member sample that was in contact with the resin film was processed into a surface roughness of Ra=0.2 mm. Likewise, using SiC abrasive paper, a surface of the Si—SiC member that was in contact with the resin film was processed into a surface roughness of Ra=0.2 mm. Next, the resin film shown in Table 3 was sandwiched between the glass member sample and the Si—SiC member sample, and the glass member sample and the Si—SiC member sample were bonded by heating them to a temperature higher than the softening point of the resin film by 20° C. and pressing them with a pressure of 2 MPa for five minutes.

<Evaluations>

The respective samples were evaluated as follows.

(Evaluation of Temperature Increase)

Using nine infrared lamps of 2 KW, the samples of Example 1 to 23 were irradiated with infrared rays (850 nm) for two minutes, and the temperature increase was evaluated. In a case where the temperature of the outermost layer exceeded 200° C., the Example in question was evaluated as "Good". In a case where the temperature of the outermost layer did not exceed 200° C., the Example in question was evaluated as "Poor". With the samples of Example 1 to 16 and 21 to 23 which are the laminated members, infrared rays were emitted from the glass member side, and the evaluations were performed with the outermost layer temperature on the Si—SiC member side. With the samples of Example 17 to Example 20, the evaluations were performed with the outermost layer temperature on the side opposite from the infrared emission side.

As shown in Table 5, Examples 17, 19, and 20 were evaluated as "Poor". With the sample of Example 17, an increase in the temperature was observed, but the temperature did not reach 200° C. With the samples of Examples 19 and 20, an increase in the temperature was not observed.

(Evaluation of Impact Resistance)

A steel ball with a weight of 533 g was dropped onto the samples of Examples 1 to 16, 18, and 21 to 23 to evaluate the impact resistance. The impact resistance evaluation was conducted with three samples (n=3) for each of the Examples. Support frames each made of a rubber plate with a thickness of 3 mm, a width of 15 mm, and hardness A50 were attached to the outer peripheral portion of the sample to sandwich and fix the sample from above and below. The steel ball was dropped so that it fell onto an area within a radius of 25 mm from the center of the sample. With a ball falling height being 20 cm, in a case where two or more samples of the three samples broke, the Example in question was evaluated as "Poor"; in a case where one sample of the three samples broke, the Example in question was evaluated as "Fair"; and in a case where all of the three samples did not break, the Example in question was evaluated as "Good". With the samples of the Examples 1 to 16, 21 to 23 which are laminated members, steel balls were dropped from the Si—SiC member side. With the Examples 17, 19, and 20, the temperature increase was evaluated as "Poor", and accordingly, the impact resistance was not evaluated. As shown in Tables 4 and 5, the Examples 1 to 7, 9 to 16, 22, and 23 were evaluated as "Good", the Examples 8 and 21 were evaluated as "Fair", and the Example 18 was evaluated as "Poor".

(Heat Resistance Evaluation)

Each sample was heated at a temperature of 230° C. for 24 hours, and changes in appearance were visually evaluated. In a case where there was no change in appearance (discoloration, foaming, generation of foreign matters, exudation of the bonding layer, and the like), the Example in question was evaluated as "Good", and in a case where there was a change in appearance, the Example in question was evaluated as "Poor". As shown in the Table 4, the Example 3 was evaluated as "Poor".

(The Amount of Bending)

The amount of bending of each of the samples of the Examples 1 to 23 was measured by measuring the three-dimensional texture of the sample surface according to ISO25178-605 using a non-contact 3D shape measuring instrument "NH-5Ns" made by Mitaka Kohki Co., Ltd. and deriving the maximum inclination-based flatness of the sample surface. Specifically, with the sample being placed on a precision surface plate, the height of each point of the upper surface of the sample was measured using a laser autofocus microscope, and a value of a gap formed when the upper surface of the sample is sandwiched by two parallel surfaces, i.e., a maximum inclination-based flatness, is derived as the amount of bending.

(Density)

The density of each of the samples of the Examples 1 to 23 was derived by dividing the weight by the volume measured by a digital measure made by DIGI-TEK Inc.

(Size of Area of Surface)

The size of area of the uppermost surface (i.e., a principal surface where a Si—SiC member is exposed in a case of a laminated member; or one of the principal surfaces in a case of a single member) of each of the samples of the Examples 1 to 23 was derived from the dimensions measured by the digital measure made by DIGI-TEK Inc.

(Thickness of Bonding Layer)

The thickness of the bonding layer (resin) of each of the samples of the Examples 1 to 16 and 21 to 23 was calculated from a cross-sectional SEM image.

According to the results of Table 4 and Table 5, it was found that the laminated member according to the aspect of the present invention has a high temperature increase speed and a high impact resistance and is suitable as a heating member.

What is claimed is:

1. A laminated member comprising:
   a glass member of which a linear transmittance at a wavelength of 850 nm is 80% or more;
   a bonding layer provided on or above the glass member, the bonding layer being constituted by a resin; and
   a Si—SiC member provided on or above the bonding layer and wherein, a density of the laminated member is 2.45 g/cm$^3$ to 2.95 g/cm$^3$.

2. The laminated member according to claim 1, wherein the linear transmittance of the glass member at a wavelength of 850 nm is 90% or more.

3. The laminated member according to claim 1, wherein a thermal conductivity of the Si—SiC member is 190 W/m·K to 300 W/m·K.

4. The laminated member according to claim 1, wherein a thickness of the glass member is 2 mm to 40 mm, and
   a thickness of the Si—SiC member is 0.5 mm to 10 mm.

5. The laminated member according to claim 1, wherein an absolute value $|\alpha-\beta|$ of a value obtained by subtracting a mean linear expansion coefficient $\beta$ of the glass member at 20° C. to 200° C. from a mean linear expansion coefficient $\alpha$ of the Si—SiC member at 20° C. to 200° C. is 2.0 ppm/° C. or less.

6. The laminated member according to claim 1, wherein the mean linear expansion coefficient $\alpha$ of the Si—SiC member at 20° C. to 200° C. is 2.10 ppm/° C. to 4.00 ppm/° C.

7. The laminated member according to claim 1, wherein a Young's modulus of the Si—SiC member is 300 GPa to 420 GPa.

8. The laminated member according to claim 1, wherein the resin is a resin of which a tolerable temperature is 230° C. to 500° C.

9. The laminated member according to claim 1, wherein a ratio of a content of metallic silicon in the Si—SiC member is 8 wt % to 60 wt %.

10. The laminated member according to claim 1, wherein an amount of bending of the laminated member is 0.25 mm or less.

11. The laminated member according to claim 1, further comprising:
    a second bonding layer provided on or above the Si—SiC member; and
    a second Si—SiC member bonded to the Si—SiC member via the second bonding layer.

* * * * *